United States Patent Office 3,158,413
Patented Nov. 24, 1964

3,158,413
BEARING ASSEMBLY
Thomas Shelley, Breaston, England, assignor to Rolls-Royce Limited, Derby, England, a company of Great Britain
Filed June 22, 1962, Ser. No. 204,308
Claims priority, application Great Britain, July 5, 1961, 24,367/61
4 Claims. (Cl. 308—35)

This invention concerns a bearing assembly.

According to the present invention, there is provided a bearing assembly comprising a roller or ball bearing having an outer race which is spaced from at least one bearing member by a clearance or clearances, and means for providing the or each said clearance with a film of oil such that, in operation, the outer race and the or each said bearing member, with the film of oil therebetween, together constitute a hydrostatic film bearing.

The said bearing member, or one of the said bearing members, may be in the form of a sleeve within which the outer race is journalled. Thus the said sleeve may be secured to a fixed member.

Alternatively the said sleeve may be received in a bore formed in a fixed member with a radial clearance between the wall of the bore and the outer surface of the sleeve, means being provided for supplying oil, to said radial clearance. The inner bore of the sleeve and/or the said wall of the bore may moreover also be lined with a bearing material.

Alternatively, or additionally, the outer race may be axially movable and may be mounted with clearances between two axially spaced bearing members which constitute thrust plates.

The outer race of the roller or ball bearing may be provided with oil seals which frictionally engage the inner race.

The fixed member may be connected to fixed bearing support structure by a yieldable connection which permits limited radial movement of the fixed member to accommodate any excessive out-of-balance load on the roller or ball bearing.

The invention also comprises a gas turbine engine provided with a bearing assembly as set forth above, the said engine having a compressor and a turbine mounted on shafting which is journalled within the roller or ball bearing of the said bearing assembly.

Figure 1:
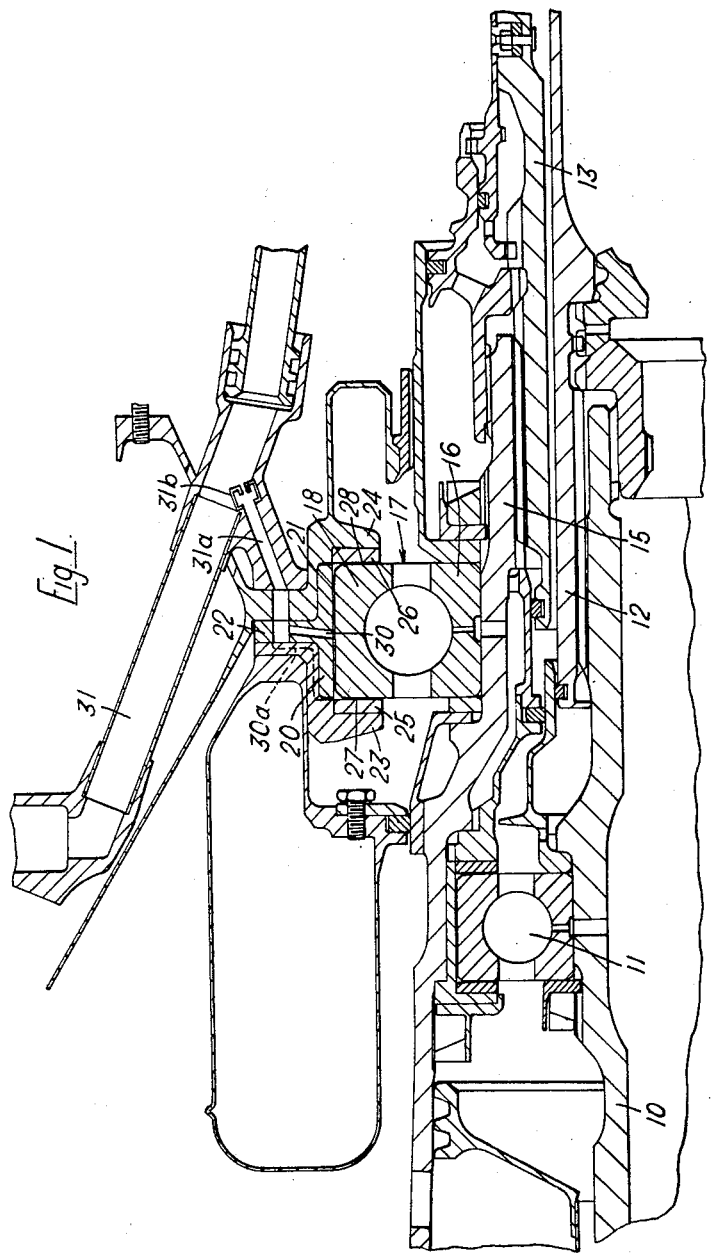
Figure 2:
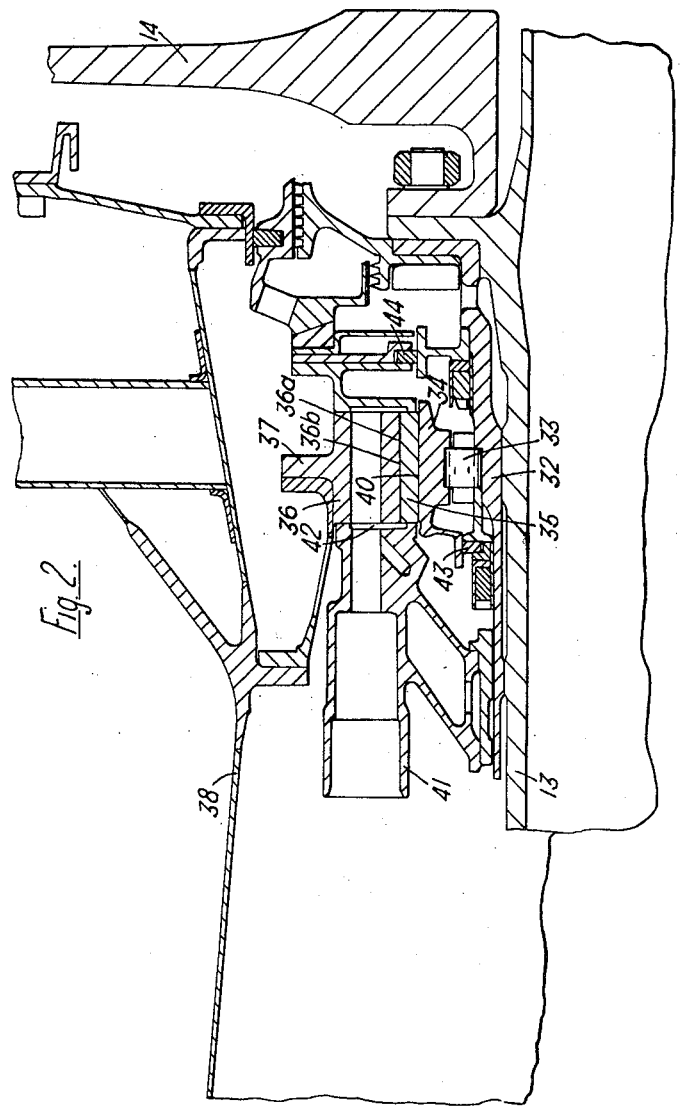
Figure 3:
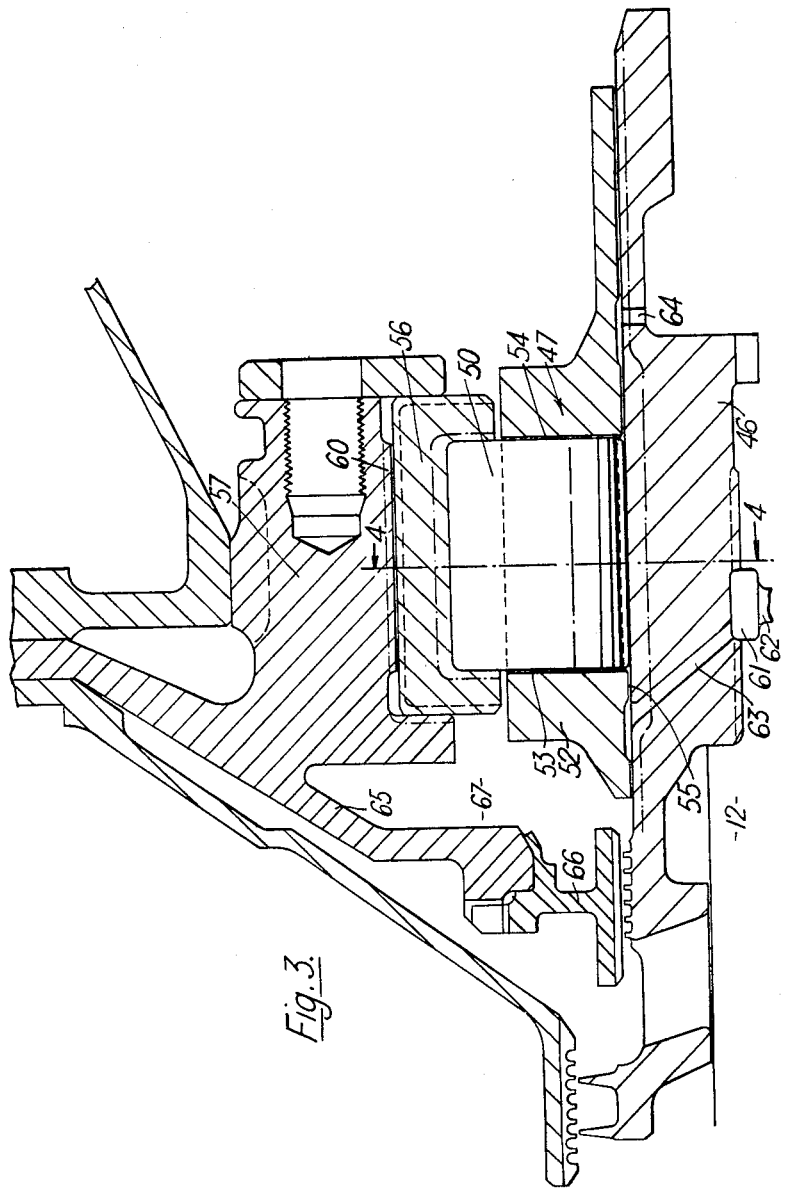
Figure 4:
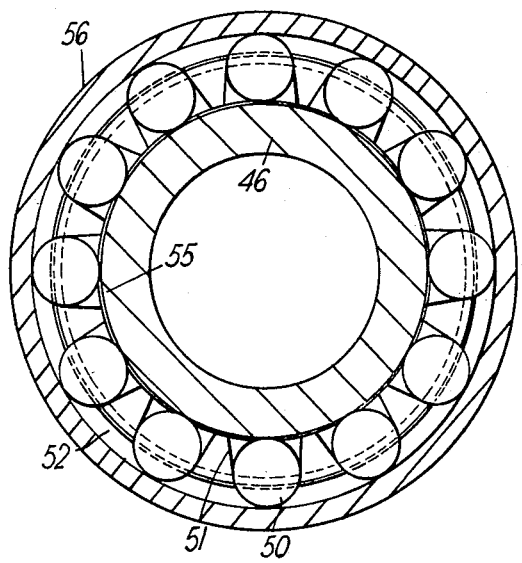

The invention is illustrated, merely by way of example, in the accompanying drawings, in which:

FIGS. 1, 2, and 3 are broken away sections through different parts of the same gas turbine engine, each said part incorporating a bearing assembly according to the present invention, and FIG. 4 is a section taken on the line 4—4 of FIG. 3.

Referring to the drawings, a gas turbine engine comprises a shaft 10 on which is mounted a low pressure compressor (not shown). The shaft 10 is mounted within a ball thrust bearing 11 and is mounted within and splined to a shaft 12 on which is mounted a low pressure turbine (not shown).

The shaft 12 is mounted concentrically within a shaft 13 which carries a high pressure turbine 14 (FIG. 2). The shaft 13 is itself mounted within and splined to a shaft 15 which carries a high pressure compressor (not shown).

The shaft 15 carries an inner race 16 of a ball thrust bearing 17. The bearing 17 has an outer race 18 which is freely rotatable mechanically, i.e. it is not secured to fixed structure. The outer race 18 is journalled within a sleeve 20, a radial clearance 21 being provided between the sleeve 20 and the outer race 18.

The sleeve 20 has a flange 22 which is clamped between an annular fixed member 23 and a fixed wall member 24, the latter being secured to the engine casing (not shown). The fixed members 23, 24 respectively carry annular thrust plates 25, 26 which are axially spaced from opposite sides of the outer race 18 by axial clearances 27, 28 respectively. The clearances 27, 28 communicate with the clearance 21.

The fixed sleeve 20, whose inner bore is lined with a bearing material (not shown), is provided with an oil conduit 30 which communicates both with the clearance 21 and with an oil pipe 31 via a drilling 31a. The drilling 31a is provided with a non-return valve 31b which prevents hydrostatic oil pressure forcing oil up the drilling 31a and back into the oil pipe 31.

Referring now to FIG. 2, the shaft 13 carries an inner race 32 of a roller bearing 33, the bearing 33 having an outer race 34 which is freely rotatable mechanically.

The outer race 34 is journalled within a sleeve 35, the latter being received in a bore 36a formed in a fixed member 36, there being a radial clearance 36b formed between the wall of the bore 36a and the outer surface of the sleeve 35.

The fixed member 36 has a flange 37 which is secured to bearing support structure 38, the latter being secured to the engine casing (not shown).

A radial clearance 40 is provided between the sleeve 35 and the outer race 34, and oil from a pipe 41 is supplied to the clearance 40 and also to the radial clearance 36b by way of a channel 42.

Piston ring seals 43, 44 are respectively provided between the outer race 34 and the inner race 32 and between the fixed member 36 and the inner race 32.

Referring now to FIGS. 3 and 4, the downstream end of the shaft 12 is mounted within an inner race 46 of a roller thrust bearing 47.

The bearing 47 has twelve rollers 50 each of which is mounted in a straight through broached pocket 51 (FIG. 4) in a cage 52. Clearances 53, 54 are provided between the ends of each roller 50 and adjacent surfaces on the cage 52.

A radial clearance 55 is provided between the cage 52 and the inner race 46, the clearance 55 communicating with the clearances 53, 54.

The bearing 47 has an outer race 56 which is freely rotatable mechanically. The outer race 56 is journalled within a fixed roller bearing housing 57 which is secured to the engine casing (not shown). A radial clearance 60 is provided between the outer race 56 and the housing 57.

An oil chamber 61 is formed between the shaft 12 and the inner race 46, and oil from the interior of the shaft 12 may reach the oil chamber 61 through a drilling 62.

The inner race 46 has a drilling 63 therethrough through which oil from the oil chamber 61 is supplied to the clearance 55 and so to the clearances 53, 54. Oil will also be supplied to the clearance 54 from the interior of the shaft 12 by way of a drilling 64 in the inner race 46.

The housing 57 has a flange 65 which carries a sealing member 66. The sealing member 66 is sealed to the inner race 46, an annular chamber 67 being formed between the flange 65 and bearing 47. Both the clearances 55, 60 communicate with the chamber 67, whereby oil from the drilling 63 passes by way of the clearance 55 to the chamber 67 and thence to the clearance 60.

In the operation of the bearing 17 shown in FIGURE 1, hydrostatic films of oil are provided between the outer race 18 and the sleeve 20, and between the outer race 18 and the thrust plates 25, 26.

As stated above, the outer race 18 is freely rotatable mechanically. Rotation of the outer race 18 is, however, resisted by the hydrostatic oil film between the outer race 18 and the sleeve 20 since there will be built up in the said hydrostatic oil film a pressure which is equal and opposite to that produced by the bearing load and which is designed to exceed the friction force of the balls in the bearing 17. It will be appreciated that any vibration arising from an out-of-balance load on the bearing 17 will be damped by the said hydrostatic oil film.

Similarly, hydrostatic oil films are, in operation, built up in the axial clearances 27, 28.

The ball thrust bearing 11, whose oil supply is not shown in FIG. 1, has not been described in detail since its construction and operation is substantially exactly the same as that of the ball thrust bearing 17.

The operation of the roller bearing 33 shown in FIGURE 2 is generally similar to that of the bearings 11, 17 except that the sleeve 35 is also free to rotate by allowing the sleeve 35 to rotate, greater control of the oil flow is obtained where large radial movement of the outer race is required. The piston ring seal 43 imposes a friction force on the outer race 34 which nevertheless permits rotation of the outer race 34.

The operation of the roller bearing 47, shown in FIGS. 3 and 4, is generally similar to that of the bearings 11, 17, a hydrostatic film of oil being provided in operation between the outer race 56 and the housing 57, and in the clearances 53, 54.

The clearance 40 is preferably small and in this case the sleeve 35 may be omitted as in the arrangement shown in FIGS. 3 and 4. If, however, a large clearance 40 is provided, it is advantageous to employ the sleeve 35 between the outer race 34 and the fixed member 36 (as in FIGURE 2) so as to increase the resistance to oil flow across the bearing.

Instead of supplying the oil to the clearance 21 (FIGURE 1) through the oil conduit 30, it may be more desirable to supply the oil to one end of the clearance 21 through passageways as shown by the chain dotted line 30a. This would obviate the need for a non-return valve 31b.

It will be appreciated that the arrangement shown in the drawings ensures self-balancing of the bearings 11, 17, 33 and 47, while having no effect on starting torque.

I claim:

1. A bearing assembly comprising a bearing member, a pair of axially spaced and transversely extending thrust surfaces, an axially movable outer race which is mounted with clearances between it and said thrust surfaces, said outer race also being spaced from the bearing member by a clearance, an inner race, rolling elements between said inner and outer races, and means for providing each of said clearances with a film of oil which provides a hydrostatic film bearing.

2. A bearing assembly comprising a sleeve, a pair of axially spaced apart and transversely extending thrust surfaces, an axially movable outer race journalled within said sleeve and spaced radially therefrom by a clearance, said outer race also having clearances between it and said thrust surfaces, an inner race, rolling elements between said inner and outer races, and means for providing each of said clearances with a film of oil, the outer race, sleeve, thrust surfaces and films of oil together constituting a hydrostatic film bearing.

3. A bearing assembly comprising a sleeve, a fixed member to which the sleeve is secured, a pair of axially spaced apart and transversely extending thrust surfaces, an axially movable outer race journalled within said sleeve and spaced radially therefrom by a clearance, said outer race also having clearances between it and said thrust surfaces, an inner race, rolling elements between said inner and outer races, and means for providing each of said clearances with a film of oil, the outer race, sleeve, thrust surfaces and films of oil together constituting a hydrostatic film bearing.

4. A bearing assembly comprising a fixed member having a bore therein, a pair of axially spaced apart and transversely extending thrust surfaces, an axially movable outer race journalled within said bore and spaced radially therefrom by a clearance, said outer race also having clearances between it and said thrust surfaces, an inner race, rolling elements between said inner and outer races, and means for providing each of said clearances with a film of oil, the outer race, bore, thrust surfaces and films of oil together constituting a hydrostatic film bearing.

References Cited by the Examiner

UNITED STATES PATENTS

| 656,310 | 8/00 | Warburton | 308—9 |
| 1,906,715 | 5/33 | Penick. | |
| 2,556,020 | 6/51 | Williams | 308—9 XR |
| 2,623,353 | 12/52 | Gerard | 308—35 |
| 2,729,518 | 1/56 | O'Connor | 308—9 |
| 3,026,154 | 3/62 | Marchand | 308—35 |

FOREIGN PATENTS 639,293    6/50    Great Britain.

FRANK SUSKO, Primary Examiner.

ROBERT M. WALKER, Examiner.